United States Patent
Kwon

(10) Patent No.: US 7,373,141 B2
(45) Date of Patent: May 13, 2008

(54) MOBILE COMMUNICATION TERMINAL AND METHOD FOR CONVERTING VOICE MESSAGE TO TEXT MESSAGE

(75) Inventor: Soon-Hwan Kwon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/006,387

(22) Filed: Dec. 7, 2004

(65) Prior Publication Data
US 2005/0255837 A1 Nov. 17, 2005

(30) Foreign Application Priority Data
May 11, 2004 (KR) .................. 10-2004-0033009

(51) Int. Cl.
*H04Q 7/38* (2006.01)
(52) U.S. Cl. ................ 455/414.4; 455/466; 455/414.1; 455/412.1; 455/413; 379/88.14
(58) Field of Classification Search ............ 455/414.1, 455/414.4, 466, 412.1, 413; 379/88.14, 88.22
See application file for complete search history.

(56) References Cited

U.S. PATENT DOCUMENTS

| 6,275,569 | B1 * | 8/2001 | Cannon ................. 379/88.01 |
| 6,526,128 | B1 | 2/2003 | Kermani |
| 6,654,448 | B1 * | 11/2003 | Agraharam et al. ..... 379/88.14 |
| 6,775,651 | B1 * | 8/2004 | Lewis et al. ................. 704/235 |
| 7,042,991 | B2 * | 5/2006 | Umstetter et al. ....... 379/93.05 |
| 2005/0164682 | A1 * | 7/2005 | Jenkins et al. ........... 455/412.1 |

FOREIGN PATENT DOCUMENTS

| GB | 2 362 745 | 11/2001 |
| JP | 10-271206 | 10/1998 |
| JP | 11-168552 | 6/1999 |
| JP | 2000-115352 | 4/2000 |
| JP | 2002-077365 | 3/2002 |
| KR | 10-2003-45440 | 7/2003 |

* cited by examiner

*Primary Examiner*—Duc M. Nguyen
*Assistant Examiner*—Justin Lee
(74) *Attorney, Agent, or Firm*—The Farrell Law Firm, PC

(57) ABSTRACT

Disclosed herein is mobile communication terminal for performing a voice-text message conversion process that includes a memory, a voice data detecting unit, a voice-text converting unit, and a controlling unit. The memory stores condition information for the voice-text message conversion process. The memory includes a voice message area for storing voice messages and a text message area for storing text messages. The voice data detecting unit extracts a voice signal from a specific voice message. The voice-text converting unit converts the voice signal to a text message. The controlling unit determines whether the voice-text message conversion process is required for the specific message, based on the condition information, and stores the text message converted by the voice data detecting unit and the voice-text converting unit in the text message area.

12 Claims, 2 Drawing Sheets

MOBILE COMMUNICATION TERMINAL AND METHOD FOR CONVERTING VOICE MESSAGE TO TEXT MESSAGE

PRIORITY

This application claims priority to an application entitled "MOBILE COMMUNICATION TERMINAL AND METHOD FOR CONVERTING VOICE MESSAGE TO TEXT MESSAGE", filed in the Korean Intellectual Property Office on May 11, 2004 and assigned Serial No. 2004-0033009, the contents of which are incorporated herein by reference.

BACKGROUND OF THE INVENTION

1. Field of the Invention

The present invention relates to a mobile communication terminal and method for managing voice messages, and more particularly to a mobile communication terminal and a method for converting a voice message into a text message and storing the converted text message in a memory having a limited capacity without erasing a previously stored voice message.

2. Description of the Related Art

At present, one of the most frequently used application services of mobile communication terminals is a Short Message Service (SMS). At the current stage of development of the mobile communication technology, users of the terminals can exchange messages including voice data, image data and text only data. Users of terminals that utilize an All-IP (Internet Protocol) network can transmit data without a complicated conversion process, are always connected to the Internet with their unique IP addresses, and can engage in a one-on-one exchange of all kinds of messages. Such users can confirm received messages promptly without connecting to a server. A Push-To-Talk (PTT) service is an example of such service in the All-IP network. Namely, the PTT is a service wherein a user of one terminal can transmit a voice message, an image and a file to a user of another terminal connected to the Internet, without dialing.

As such, the characteristics of the All-IP network are designed to allow the terminal users to exchange multi-media messages, including voice and image data, as well as text data with one another without having to depend on a central server. Therefore the message size can be increased hundreds to tens of hundreds of times, compared with that of conventional text messaging.

Meanwhile, a general mobile communication terminal has inherent hardware restrictions, and therefore cannot secure a relatively large memory size to receive a plurality of multi-media messages. Therefore, a user of the general mobile communication terminal must always monitor whether the amount of received messages approaches a capacity limit of a message area allocated in its memory, and must manage the message area for receiving further messages.

In conventional voice message services, if a caller of one mobile communication terminal records his/her voice therein and then uploads it to a server, the server informs a corresponding recipient of another mobile communication terminal of arrival of a multi-media message corresponding to the caller's voice via SMS. Then the corresponding recipient connects to the server using his/her mobile communication terminal to receive the voice message.

A comparison of voice messages with text messages, and the inherent characteristics of voice messages, indicates that the data size per voice message is relatively larger than for text messages. For example, if the word "HELLO" is recorded as a voice message, even though voice data size depends on a reading speed and various environmental factors, the voice data will consume tens of kilobytes in a memory. However, if the same word is converted to a text message, then text data of the text message consumes a relatively small amount of the memory, compared with the voice data. More specifically, if the word "HELLO" is converted to a text message, text data of the text message consumes five bytes in the memory, because a character requires one byte. Therefore, when expressing the same information, the voice and text data differ greatly in terms of memory consumption.

Meanwhile, when a conventional mobile communication terminal receives a voice message, the voice message remains in a voice message area of a memory before a user directly confirms and then erases the voice message. From characteristics of the mobile communication terminal, since its memory size is restricted, if a voice message not confirmed by the user or a voice message confirmed but not erased by the user is successively stored in the memory, the size of the memory can be insufficient to store a newly received voice message.

A conventional technique for managing terminal memory to resolve such memory shortage, for mobile communication terminals that mainly provide SMS, is to inform a user that messages stored in a memory of the prior art mobile communication terminal must be erased when a total size of the messages exceeds a predetermined portion of the memory. Therefore, a user of the terminal directly selects and deletes corresponding messages.

U.S. Pat. No. 6,526,128 to Bahram G. Kermani entitled "PARTIAL VOICE MESSAGE DELETION" proposed that if the amount of messages stored in a memory of an automatic answering machine exceeds a predetermined portion, the stored messages are automatically erased from the memory, such that the memory can always receive a new message. However, such conventional automatic erasing method has disadvantages of a message to be deleted must be reconfirmed or a message not confirmed by the user may be automatically erased. Also, even if the "automatic deletion" mode is not set, when attempting to erase corresponding messages, the user must provide a confirmation of deletion one by one.

In a voice-text conversion technique, if a caller of one mobile communication terminal uploads his/her voice to a server, the server converts the voice to a text message and then transmits the converted text message to a corresponding recipient of another mobile communication terminal.

Korean Patent Application No. 10-2003-0045440, filed on Jul. 4, 2003, entitled "TERMINAL HAVING FUNCTION OF INTERCONVERTING BETWEEN VOICE MESSAGE AND TEXT MESSAGE AND METHOD FOR INTERCONVERTING BETWEEN VOICE MESSAGE AND TEXT MESSAGE IN THE SAME" discloses a technique for converting between a voice message and a text message. However, an object of the system described in that application is to provide a terminal for converting a voice message or text message received in a terminal to a format desired by a recipient of the terminal and outputting the same. Namely, if the terminal receives a voice message, the voice message can be converted to a text message and then outputted, or if the terminal receives a text message, the text message can be converted to a voice message and then outputted as voice. Therefore, the terminal can be easily used by the disabled.

SUMMARY OF THE INVENTION

Therefore, the present invention has been made in view of the above problems, and it is an object of the present invention to provide a mobile communication terminal and method for converting a voice message to a text message and storing the converted text message in a memory with a limited capacity without erasing a pre-stored voice message.

In accordance with one embodiment of the present invention, the above and other objects can be accomplished by providing a mobile communication terminal for performing a voice-text message conversion process that includes a memory for storing condition information for the voice-text message conversion process, said memory including a voice message area for storing voice messages and a text message area for storing text messages, a voice data detecting unit for extracting a voice signal from a specific one of the voice messages, a voice-text converting unit for converting the voice signal to a text message, and a controlling unit for determining whether voice-text message conversion is required for the specific voice message, based on the condition information, and storing the text message converted by the voice-text converting unit in the text message area.

In accordance with another embodiment of the present invention, there is provided a method for performing a voice-text message conversion process that includes determining whether the voice-text message conversion process is required for a specific voice message from among voice messages, extracting a voice signal from the specific voice message, if the voice-text message conversion process is determined to be required for the specific voice message, converting the voice signal into a text message, and storing the text message in the memory.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted to avoid making the subject matter of the present invention unclear.

Figure 1:
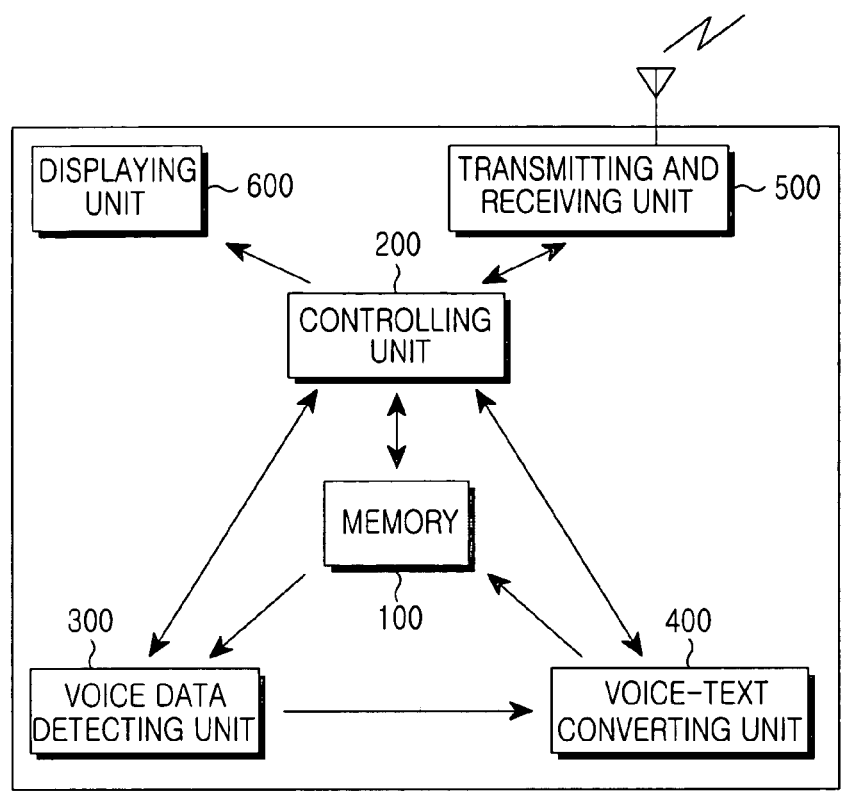
FIG. 1 is a block diagram showing the construction of a mobile communication terminal for converting a voice message to a text message according to a preferred embodiment of the present invention.

FIG. 1 is a block diagram showing the construction of a mobile communication terminal for converting a voice message to a text message according to a preferred embodiment of the present invention.

As shown in FIG. 1, the mobile communication terminal comprises a memory 100, which includes a text message area M1, a voice message area M2, and a condition information storing area M3 for storing condition information for a voice-text message conversion process, which are described below with reference to FIG. 2, a voice data detecting unit 300 for extracting a voice signal from a voice message, a voice-text converting unit 400 for converting the voice signal to a text message, a controlling unit 200 for determining whether the voice-text message conversion process is required for the voice message based on the condition information, and storing the text message converted by the voice-text converting unit 400 in the text message area M1, a transmitting and receiving unit 500 for transmitting and receiving the voice or text message signal to and from the terminal, and a displaying unit 600 for displaying information to the user.

Figure 2:
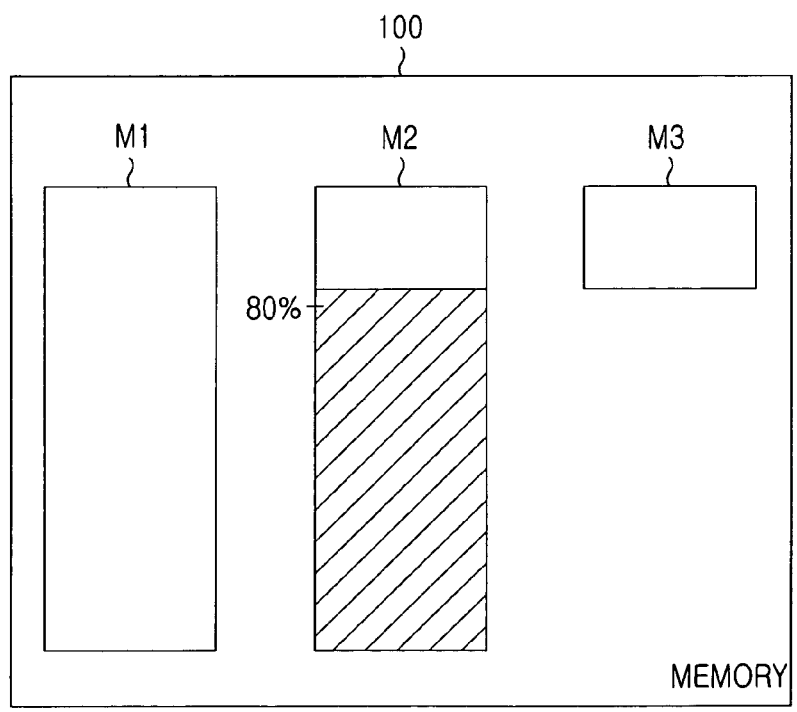
FIG. 2 is a memory map of the mobile communication terminal of FIG. 1.

FIG. 2 is a memory map of the mobile communication terminal of FIG. 1. As shown in FIG. 2, the memory 100 comprises a text message area M1 for storing the received text message and the text message converted by the voice-text converting unit 400 of FIG. 1, a voice message area M2 for storing the voice message received from the external system, and a condition information storing area M3 for storing condition information for a voice-text message conversion process.

Here, the condition information includes a threshold to restrict a total size of the voice messages stored in the voice message area M2 and selection reference information of a voice message to be converted to a text message. Meanwhile, the condition information can be set to include various conditions set by the user.

For example, if there is condition information in the condition information storing area M3 that indicates that a total size of voice messages stored in the voice message area M2 exceeds 80% of a total storage capacity" or that voice messages of all voice messages stored in the voice message area M2 are more than two weeks old and not locked for protection, then the controlling unit 200 compares the total size of voice messages with the threshold set in the condition information. Namely, as shown in FIG. 2, if the total size of voice messages stored in the voice message area M2, shown shaded by slanted lines, exceeds 80% of the total storage capacity of the voice message area M2, the controlling unit 200 selects a specific one of the voice messages, satisfying selection reference information set in the condition information of the condition information storing area M3.

Here, if the number of the voice messages satisfying the selection reference information is more than one, the controlling unit 200 designates a voice message that is oldest in age as a highest priority voice message, which requires a voice-text conversion process. After that, the controlling unit 200 determines priorities of the voice messages for the voice-text message conversion process based on the age of the voice messages.

The voice data detecting unit 300 extracts a voice signal from the voice message selected by the controlling unit 200. More specifically, first of all, the voice data detecting unit 300 extracts only voice data from a specific voice message from among the voice messages stored in various formats based on an application program or protocol. After that, the voice data detecting unit 300 recognizes a CODEC used on the voice data and extracts a voice signal from the voice data. For example, the voice data detecting unit 300 extracts a voice signal from a voice message which is stored in Extensible Markup Language (XML)+Multi-purpose Internet Mail Extension (MIME) format and typically encoded by Internet (e.g. POSTN, ISDN, LAN, WAN) voice communication standard G.723.1 developed in G.723.1 consortium (DSPG, Cisco, French Telecom, NTT AudioCodes, University of Sherbrooke).

The voice-text converting unit 400 extracts features of the voice signal extracted in the voice data detecting unit 300. After that, the voice-text converting unit 400 compares the features with a reference model and measures a similarity thereof. Also, the voice-text converting unit 400 converts the voice signal to text, and generates a text message from the text. Here, a detailed description of a method of recognizing a voice will be omitted, since the method is well-known to those of skill in the art.

Figure 3:
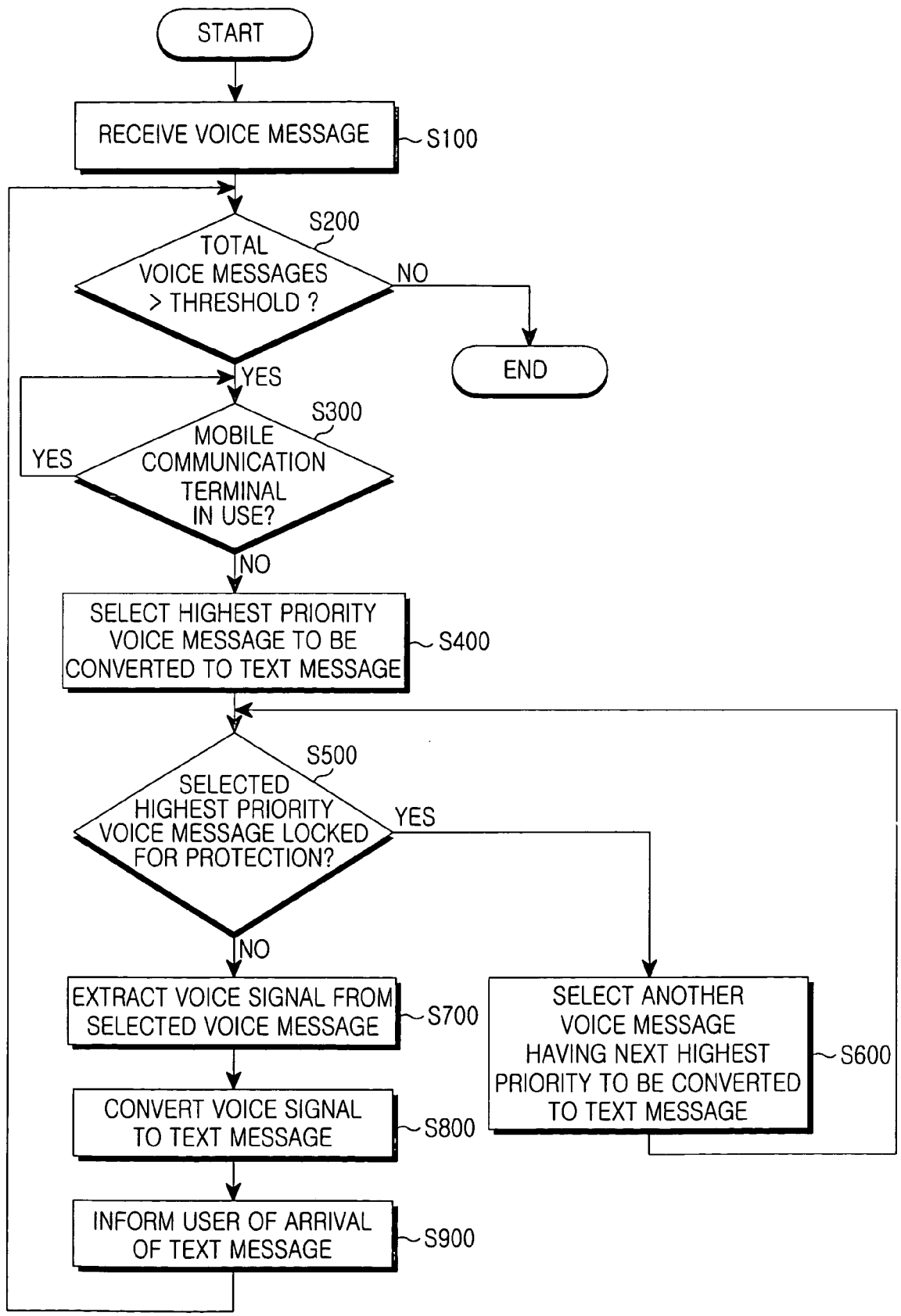
FIG. 3 is a flow chart showing a method for converting a voice message to a text message in the mobile communication terminal of FIG. 1 according to another preferred embodiment of the present invention.

FIG. 3 is a flow chart showing a method for converting a voice message to a text message in the mobile communication terminal of FIG. 1 according to another preferred embodiment of the present invention.

The controlling unit 200 of FIG. 1 receives a voice message via the transmitting and receiving unit 500 at step S100. After receiving the voice message, the controlling unit 200 compares a total size of voice messages in voice message area M2, which includes the received voice message, with a threshold set in condition information in the condition information storing area M3 at step S200.

If a total size of voice messages stored in voice message area M2 is larger than the threshold, the controlling unit 200 checks whether a mobile communication terminal is in use by a user at step S300. Here, according to application services, the voice-text message conversion process does not need to be implemented in real-time. For example, if a mobile communication terminal receives a voice message from an external system, there are some cases that a user of the mobile communication terminal may confirm the voice message simultaneously or later, or may not confirm the voice message, as the user did not recognize arrival thereof. The controlling unit 200 checks such cases at step S300. After checking, the controlling unit 200 puts the voice-text message conversion process on standby, if the mobile communication terminal is in use by the user.

If the message was not confirmed by the user or the mobile communication terminal was not in use, the controlling unit 200 terminates the standby state, and performs the voice-text message conversion process. Here, the voice-text message conversion process has a lowest priority among a plurality of processes performed in the mobile communication terminal to receive CPU (Central Processing Unit) resources.

Therefore, the mobile communication terminals, even those having much fewer CPU resources, can provide proper performance of the voice-text message conversion process. Because the voice-text message conversion process does not need to be performed in real time, a processor of the mobile communication terminal can readily secure sufficient time to perform the process without interfering with higher priority processes. Therefore, even a processor having less operability can achieve a relatively high recognition rate in the voice-text message conversion process.

If the mobile communication terminal is not in use by the user, the controlling unit 200 selects a voice message having a highest priority for the voice-text message conversion process, based on selection reference information set in condition information of the condition information storing area M3 at step S400.

After selecting the voice message having the highest priority, the controlling unit 200 checks whether the highest priority voice message is locked for protection at step S500. If the highest priority voice message is locked for protection, the controlling unit 200 changes to another voice message having a second highest priority as a new highest priority voice message, which requires the voice-text message conversion process, and returns from step S600 to step S500.

Meanwhile, if the highest priority voice message is not locked for protection, the controlling unit 200 extracts a voice signal from the highest priority voice message via the voice data detecting unit 300 at step S700. After extracting the voice signal, the controlling unit 200 converts the voice signal to a text message via the voice-text converting unit 400 and stores the text message in text message area Ml at step S800. After storing, the controlling unit 200 informs the user of arrival of the text message at step S900. The controlling unit 200 then returns to the step S200 and repeatedly performs the voice-text message conversion process until the total size of the voice messages of the voice message area M2, which is reduced as the voice-text message conversion process progresses, is smaller than the threshold set in the condition information stored in the condition information storing area M3. Here, the total size of the voice messages is reduced by a size of the voice message converted to text messages.

Even if the total size of voice messages stored in the voice message area M2 is smaller than the threshold set in the condition information of the condition information storing area M3, as the user directly selects the voice message, and converts the selected voice message to the text message, the mobile communication terminal can adjust the size of the voice messages stored in the voice message area M2 without losing the inherent information of the voice message.

As described above, the mobile communication terminal of the present invention resolved the prior problems that new voice messages cannot be received in the memory when voice messages which are irregularly received are not confirmed by the user of the mobile communication terminal for a long period of time, or the voice message confirmed by the user is not erased from the memory.

Also, users of conventional mobile communication terminals must always monitor whether the amount of voice messages currently received approaches a storage capacity limit of the memory and must manage the memory to ensure receipt of a new message. However, the mobile communication terminal of the present invention automatically checks and manages the memory state.

Further, the mobile communication terminal of the present invention does not erase voice messages to save limited memory capacity, but instead converts the voice messages to text messages. Therefore data stored in the memory can be reduced by a relatively large ratio without losing its inherent information.

Further still, if the method of the present invention is applied to store image information included in a multi-media message, it can reduce a size of data corresponding to the multi-media message as the image information is removed therefrom, or a resolution of the image information is reduced, or color image of the image information is changed to grayscale image. Also, the mobile communication terminal of the present invention can efficiently utilize memory resources, as less important voice messages are converted to text messages.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile communication terminal for performing a voice-text message conversion process comprising:
   a memory for storing condition information for determining when the voice-text message conversion process occurs and selecting a specific voice message among received and stored voice messages which is a target of the voice-text message conversion, said memory including a voice message area for storing voice messages and a text message area for storing text messages;
   a voice data detecting unit for extracting a voice signal from the specific voice message;
   a voice-text converting unit for converting the voice signal to a text message;
   a controlling unit for determining whether voice-text message conversion is required for the received and stored voice messages, and selecting the specific voice message, based on the condition information, and storing the text message converted by the voice-text converting unit in the text message area,
   wherein whether the voice-text message conversion is required is determined by comparing a total size of the voice messages with a threshold set in the condition information;
   selecting a voice message having a highest priority for voice-text message conversion from among the voice messages, based on selection reference information set in the condition information, if the total size of the voice messages is larger than the threshold;
   checking whether the voice message having the highest priority is locked for protection; and
   selecting the voice message having the highest priority for voice-text message conversion if the voice message is not locked, and selecting an other voice message having a second highest priority as a new highest priority if the voice message is locked.

2. The mobile communication terminal as set forth in claim 1, wherein said voice-text message conversion process has a lowest priority among a plurality of processes performed in the mobile communication terminal to receive CPU (Central Processing Unit) resources.

3. The mobile communication terminal as set forth in claim 1, wherein said condition information stored in the memory includes:
   a threshold set not to exceed a total size of the voice messages stored in the voice message area; and
   selection reference information of the voice messages requiring voice-text conversion, said selection reference information being preset by a user.

4. The mobile communication terminal as set forth in claim 3, wherein said controlling unit compares the total size of the voice messages with the threshold.

5. The mobile communication terminal as set forth in claim 3, wherein said controlling unit selects a voice message having a highest priority for voice-text message conversion from among the voice messages using the selection reference information.

6. The mobile communication terminal as set forth in claim 5, wherein said controlling unit checks whether the voice message having the highest priority is locked for protection, extracts a voice signal from the voice message through the voice data detecting unit if the voice message is not locked, and selects an other voice message having a second highest priority as a new highest priority voice message among the voice messages if the voice message is locked.

7. The mobile communication terminal as set forth in claim 6, wherein said controlling unit converts the voice signal extracted from the voice message having the highest priority to a text message through the voice-text converting unit.

8. The mobile communication terminal as set forth in claim 1, wherein said controlling unit informs a user of the text message.

9. A method for performing a voice-text message conversion process comprising:
   determining whether voice-text message conversion is required by comparing a total size of the voice messages with a threshold set in the condition information, selecting a voice message having a highest priority for voice-text message conversion from among the voice messages, based on selection reference information set in the condition information, if the total size of the voice messages is larger than the threshold,
   checking whether the voice message having the highest priority is locked for protection, and selecting the voice message having the highest priority for voice-text message conversion if the voice message is not locked, and selecting an other voice message having a second highest priority as a new highest priority if the voice message is locked;
   selecting a specific voice message among received and stored voice messages which is a target of the voice-text message conversion if the voice-text message conversion is required;
   extracting a voice signal from the specific voice message;
   converting the voice signal into a text message; and
   storing the text message in the memory.

10. The method as set forth in claim 9, wherein said determining step is performed based on condition information for voice-text message conversion, said condition information being preset by a user.

11. The method as set forth in claim 9, further comprising repeatedly performing voice-text message conversion until the total size of the voice messages, which is reduced as the voice-text message conversion process progresses, is smaller than the threshold, wherein the total size of the voice messages is reduced by a size of the voice messages converted to text messages.

12. The method as set forth in claim 9, further comprising:
   informing a user of the converted text message.

* * * * *